United States Patent
Oldeide (10) Patent No.: US 12,442,448 B2
(45) Date of Patent: Oct. 14, 2025

(54) GEAR SHIFT ACTUATOR

(71) Applicant: Kongsberg Automotive Holding 2 AS, Kongsberg (NO)

(72) Inventor: Christer Kobbevik Oldeide, Kongsberg (NO)

(73) Assignee: Kongsberg Automotive Holding 2 AS, Kongsberg (NO)

( * ) Notice: Subject to any disclaimer, the term of this patent is extended or adjusted under 35 U.S.C. 154(b) by 0 days.

(21) Appl. No.: 18/709,282

(22) PCT Filed: Mar. 4, 2022

(86) PCT No.: PCT/EP2022/055536
§ 371 (c)(1),
(2) Date: May 10, 2024

(87) PCT Pub. No.: WO2023/165705
PCT Pub. Date: Sep. 7, 2023

(65) Prior Publication Data
US 2025/0003488 A1    Jan. 2, 2025

(51) Int. Cl.
*F16H 61/28* (2006.01)
*F16H 63/18* (2006.01)
(Continued)

(52) U.S. Cl.
CPC ............ *F16H 61/28* (2013.01); *F16H 63/18* (2013.01); *F16H 63/304* (2013.01);
(Continued)

(58) Field of Classification Search
CPC ...... F16H 59/041; F16H 59/042; F16H 61/28; F16H 2061/2869; F16H 63/18;
(Continued)

(56) References Cited

U.S. PATENT DOCUMENTS 6,122,983 A * 9/2000 Hoffman ............. F16H 63/3069
74/473.1
9,732,849 B2 * 8/2017 Remmler ................ F16H 3/085
(Continued)

FOREIGN PATENT DOCUMENTS

DE    102014003238 A1    9/2015
DE    102016119269 A1 *  5/2017 ............. B60K 17/08
(Continued)

OTHER PUBLICATIONS

International Search Report for Application No. PCT/EP2022/055536 dated Oct. 21, 2022, 2 pages.
(Continued)

*Primary Examiner* — Bobby Rushing, Jr.
(74) *Attorney, Agent, or Firm* — Howard & Howard Attorneys PLLC (57) ABSTRACT

A gear shift actuator includes a linear drive assembly having a supported rotary member that is axially unmovable, an electric motor for rotating the rotary member, and a driven component engaged by the rotary member to transmit rotary movement into a linear axial movement of the driven component to drive a shift fork between a neutral and a first gear engaged position. The assembly includes wherein the rotary member has a hollow cylindrical sleeve having a first cam follower and the driven component has a first barrel cam that receives the cam follower and is supported in the sleeve by a central rod to be slidably axially moveable but locked against rotational movements. The supported central rod is also axially moveable but locked against rotational movements and carries a second end stop at a distance to the first barrel cam and is configured to be linked to a shift fork.

15 Claims, 7 Drawing Sheets

(51) Int. Cl.
*F16H 63/30* (2006.01)
*F16H 63/32* (2006.01)

(52) U.S. Cl.
CPC ............... *F16H 2061/2869* (2013.01); *F16H 2063/3056* (2013.01); *F16H 2063/321* (2013.01)

(58) Field of Classification Search
CPC ......... F16H 2063/321; F16H 2063/324; F16H 63/304; F16H 2063/3056
See application file for complete search history.

(56) References Cited

U.S. PATENT DOCUMENTS

| | | | | |
|---|---|---|---|---|
| 10,066,743 | B2 * | 9/2018 | Pritchard | ............... F16H 63/304 |
| 10,988,022 | B2 * | 4/2021 | Pritchard | ............... B60K 23/08 |
| 2015/0107955 | A1 | 4/2015 | Tronnberg | |

FOREIGN PATENT DOCUMENTS

| | | | | |
|---|---|---|---|---|
| FR | 2747170 | A1 * | 10/1997 | ............. F16H 61/28 |
| FR | 2912795 | A1 | 8/2008 | |
| GB | 2524392 | A | 9/2015 | |
| JP | 6116280 | B2 * | 4/2017 | ......... F16H 61/2807 |
| WO | WO-2020025280 | A1 * | 2/2020 | ............. F16H 61/28 |

OTHER PUBLICATIONS

Machine-assisted English language abstract for DE 10 2014 003 238 A1 extracted from espacenet.com database on May 12, 2024, 2 pages.

English language abstract for FR 2 912 795 A1 extracted from espacenet.com database on May 12, 2024, 2 pages.

* cited by examiner

GEAR SHIFT ACTUATOR

This application is the National Stage of International Patent Application No. PCT/EP2022/055536, filed on Mar. 4, 2022, the contents of which are incorporated herein by reference in their entirety.

The present invention is directed to a gear shift actuator comprising a linear drive assembly having a rotary member which is supported in a housing to be rotatable, but unmovable in an axial direction defined by its rotary axis, an electric motor for rotating the rotary member, and a driven component engaged by the rotary member to transmit rotary movement of the rotary member into a linear movement of the driven component along the axial direction for driving a shift fork from a neutral position to a first gear engaged position and back to neutral, when the rotary member is driven to rotate in a first sense of rotation and in a second sense of rotation opposite to the first sense of rotation, respectively.

Gear shift actuators are utilized in motor vehicles to shift transmission between two coaxially disposed, rotary shafts between a gear engaged position in which rotary engagement between the two shafts is established and torque transmission takes place, and a neutral, disengaged position, in which the two rotary shafts are decoupled from each other. A typical case of application for a gear shift actuator of the above-described type is an actuator for a dog clutch. A dog clutch is a mechanism for connecting and disconnecting two rotating shafts. It is based on the working principle to make a set of regularly spaced teeth or protrusions on one wheel connected to one of the shafts to a set of complementary recesses between teeth on another wheel connected to second shaft. When the two wheels are moved together such that the teeth of the first wheel are received in the recesses formed between teeth of the second wheel a slip-free rotary engagement between the shafts is established. A dog clutch with a dog clutch actuator is for example described in US 2015/0107955 A1. The gear shift actuator comprises a linear drive assembly having a rotary member in the form of a lead screw which is supported to be rotatable, but not moveable in the direction of its rotary axis, an electric motor for rotating the lead screw, and a driven component in the form of a nut engaged by the lead screw. By engagement of nut and lead screw rotary movement of the lead screw is transmitted into a linear movement of the nut along the axial direction of the rotary axis of the lead screw. The driven component in form of the nut is connected to a shift fork for driven it from a neutral position to a gear engaged position and vice versa, when the lead screw is driven to rotate in a first sense of rotation and in a second sense of rotation opposite to the first sense of rotation, respectively. In the neutral position of the shift fork one of the teeth carrying wheels is moved away from the other so that the rotary interengagement between the two wheels is ceased. By moving the shift fork using the linear drive assembly to the gear engaged position the two teeth or dog wheels are moved into rotary inter engagement with the teeth of one wheel being received in the recesses between the teeth of the other wheel.

For such gear shift actuators the situation may arise that the two teeth or dog wheels are in a relative angular position with respect to each other such that the teeth of one wheel are facing directly opposite teeth of the other wheel, in which case the gear shift actuator cannot shift to the gear engaged position until the dog wheels have rotated relative to each other so that the dogs of one wheel are aligned with recesses between dogs of the other wheel.

It is an object of the present invention to provide a gear shift actuator designed such that it can deal with situations in which a shift fork to be actuated by the gear shift actuator is temporarily blocked in a simple and reliable manner.

This object is achieved by a gear shift actuator comprising the features of claim 1. Preferred embodiments of the invention are set out in the dependent claims.

According to the present invention the rotary member comprises a hollow cylindrical sleeve which is provided with a first cam follower projecting inwardly from an inner wall of the sleeve. The driven component comprises a first barrel cam which has a helical cam groove in its outer wall configured to receive the first cam follower. The first barrel cam is supported in the sleeve by a central rod to be slidably moveable in the sleeve along the central rod in axial direction but to be locked against rotational movements around the axial direction with respect to the central rod. The central rod in turn is supported in the housing to be moveable in axial direction but to be locked against rotational movements around the axial direction with respect to the housing. The central rod carries a second end stop coupled thereto at a distance to the first barrel cam. The central rod is configured to project from the housing and to be linked to a shift fork for driving it. A compression mechanism is disposed between the second end stop and the first barrel cam and is configured to extend the central rod from the first barrel cam by biasing the second end stop away from the first barrel cam, wherein this biased movement of the central rod is limited by a first end stop on the central rod abutting against the first barrel cam on the side opposite to the compression mechanism. The helical cam groove is arranged and configured such that rotation of the sleeve in the first sense of rotation moves the first barrel cam axially in a first direction by movement of the first cam follower along the helical cam groove, wherein this movement in the first direction is transmitted via the compression mechanism and the second end stop to the central rod to drive a coupled shift fork from the neutral position towards the first gear engaged position, and such that rotation of the sleeve in the second sense of rotation moves first barrel cam in an opposite second direction by moving the first cam follower along the first cam groove, which movement of the first barrel cam in the second direction is transmitted via the first end stop directly to the central rod to drive a coupled shift fork from the first gear engaged position back to the neutral position.

The actuation characteristics of this gear shift actuator is asymmetric in that the movement of the first barrel cam, when moving in the first direction to move a shift fork from neutral to a first gear, is transmitted to the compression mechanism and from the compression mechanism (via the second end stop) further to the central rod, whereas movement of the first barrel cam in the opposite second direction to move a shift fork back from the first gear to the neutral position is transmitted from the first barrel cam directly (i.e. not via the compression mechanism) via the first end stop to the central rod. In this manner the central rod is acting in a compliant or yielding manner when it is moved in the first direction to move from neutral to first gear which means that, when the shift fork is blocked, the movement of the first barrel cam is absorbed by the compression mechanism which thereby is compressed and stores the actuation force without further moving the central rod; once the blocked state of the shift fork is released the expanding movement of the compression mechanism moves the central rod to shift a shift fork to the first gear engaged position. On the other hand, in the opposite second direction the central rod is driven in a stiff or direct contact manner by the first barrel cam which exerts force directly via the first end stop of the central rod. In this manner the linear drive mechanism in the first direction can be driven in a complete cycle from a positioning corresponding to neutral to a first gear engaged positioning, wherein this movement is partially absorbed by the compression mechanism in case the central rod is acting against a blocked shift fork.

After the blocked state of the shift fork is released the conserved compression energy in the compression mechanism is released and moves the central rod to move the shift fork to the first gear engaged position. In this way the actuation force exerted by the linear drive assembly when the first barrel cam is moved in the first direction is in a simple end reliable manner mechanically stored in the compression mechanism and will be released at any time as soon as the blocked state of a shift fork is released.

In a preferred embodiment a symmetric arrangement of two barrel cams (one on each side of the compression mechanism) is provided on the central rod which is capable of driving the central rod from neutral in a first axial direction to a first gear engaged position, and from neutral in a second axial direction opposite to the first direction to a second gear engaged position. In particular, in this embodiment a second barrel cam is disposed between the second end stop and the compression mechanism, wherein the second barrel cam is, like the first barrel cam, support by the central rod to be axially moveable, but locked against rotational movement around the axial direction with respect to the central rod, wherein the second barrel cam is biased by the compression mechanism towards the second end stop. In other words the compression mechanism biases the first barrel cam towards the first end stop and the second barrel cam towards the second end stop on the central rod. The sleeve is provided with a second cam follower which is disposed circumferentially aligned in the sleeve with the first cam follower and which is received in a helical cam groove of the second barrel cam. Each of the helical cam grooves, extends about 180° around the circumference of the respective barrel cam, whereas the remaining circumferential portion of the surface of the respective one of the first and second barrel cams is a recessed portion such that the respective one of the first and second cam followers is free to move in the recessed portion in axial direction when it is located in the associated recessed portion. Actually, there is a small overlap region around the positioning when both first and second cam followers are partially within their associated cam grooves. Due to the finite extension of the first end second cam followers in their associated cam grooves a certain rotational movement of the sleeve is necessary until one of the first and second cam followers has completely entered the associated cam groove and the other one has completely left its associated cam groove and is completely disposed in the associated recessed portion. In the following this small rotational overlap region is not mentioned to simplify the description.

The helical cam grooves of the first and second barrel cams are in rotational direction offset by 180° with respect to each other such that, when the first cam follower is engaged in the cam groove of the first barrel cam, the second cam follower is located in the recessed portion of the second barrel cam, so that, when the central rod is in the position corresponding to the neutral position of a coupled shift fork, rotation of the sleeve in the second sense of rotation moves the second barrel cam in the second direction, which movement is transmitted through the compression mechanism (via the first barrel cam and the first end stop) to the central rod to drive a coupled shift fork from neutral towards a second gear engaged position, and such that, when the central rod is in the position corresponding to the second gear engaged position of a coupled shift fork, rotation of the sleeve in the first sense of rotation moves the second barrel cam in the first direction, which movement is transmitted via the second end stop to the central rod directly to drive a coupled shift fork from the second gear engaged position back to the neutral position. Therefore, also the actuation characteristic for the movement from a neutral position to a second gear engaged position of a coupled shift fork is asymmetric in the sense that the actuating movement of the central rod to move a coupled shift fork from neutral into the second gear engaged position is compliant and capable of absorbing actuating movement of the second barrel cam by compression of the compression mechanism in case the shift fork is blocked, wherein the compression of the compression mechanism provides the driving force for completing the movement of the shift fork into the second gear engaged position as soon as the blocked state is released, whereas the actuating movement of the second barrel cam in the opposite direction to move a coupled shift fork from the second gear engaged position to the neutral position is transmitted (via the second end stop) directly to the central rod so that force is transmitted in a stiff manner to the central rod when moving a coupled shift fork from the second gear engaged position back to neutral. Thus, the actuation characteristics of the second barrel cam movement are symmetrical to the actuation movements of the first barrel cam as described above.

In a preferred embodiment the compression mechanism comprises a compression spring extending in the axial direction from the first barrel cam along the central rod in the direction towards the second end stop on the central rod remote from the first barrel cam to bias the second end stop away from the first barrel cam.

In a preferred embodiment the central rod has a non-circular cross-sectional shape and each of the first and second barrel cams has an opening of complementary cross-sectional shape such that the central rod, when it is received in the openings of the first and second barrel cams, allows sliding movement of the first and second barrel cams in axial direction, but locks the first and second barrel cams against rotational movements around the axial direction. For this purpose the non-circular cross-sectional shape can for example be formed by any kind of keyed surface of the central rod, for example a planar surface portion which is in abutment on a complementary planar surface portion in the openings of the barrel cams.

In a preferred embodiment the compression mechanisms and the sliding resistance of the first barrel cam for axial movements on the central rod are arranged such that the first barrel cam starts moving and starts to compress the compression mechanism once a predetermined threshold force is acting between the first barrel cam and the central rod. In this manner it is achieved that the first barrel cam is held on the central rod in a manner that is not too spongy, whereas the barrel cam is able to react and to move with respect to the central rod when the central rod is blocked by a substantial counter-force.

In a preferred embodiment the second barrel cam has the same shape as the first barrel cam but is disposed rotated around 180° with respect to the first barrel cam such that two corresponding end surfaces of the first and second barrel cams are facing each other, wherein the second barrel cam is disposed rotated by 180° around the axial direction relative to the first barrel cam. With this arrangement the helical cam grooves of the first and second barrel cam have the same shape and arrangement on the respective barrel cams to and cooperate with the respective one of the first and second cam followers in a symmetric manner for the first and second barrel cams.

The invention will now be described with reference to an embodiment shown in the drawings in which.

The invention will know first be described with reference to the simple embodiment shown in FIG. 9 which shows a schematic, partially cross-sectional view of a gear shift actuator capable of shifting a coupled shift fork 50 from a neutral position N to a first gear engaged position and back again to neutral position. The gear shift actuator comprises a rotary member in the form of a cylindrical, hollow sleeve 4 which is driven by an electric motor (not shown) to rotate selectively in a first sense of rotation and in an opposed second sense of rotation. The cylindrical sleeve 4 is supported in a housing (not shown) of the actuator to be rotatable about a rotational axis of the sleeve 4 defining an axial direction, wherein the sleeve 4 is supported such that it is unmovable in the axial direction with respect to the housing. The sleeve 4 is provided with a first cam follower 6 projecting radially inwardly from an inner wall of the sleeve. The first cam follower 6 is shown as a short cylindrical pin.

The gear shift actuator further comprises a first barrel cam 10 which also is generally cylindrical and which is received in the interior of the sleeve 4. The barrel cam 10 is supported by a central rod 30 extending inside of the sleeve 4 in the axial direction and projecting from the sleeve 4 to be coupled to a shift fork 50. The central rod 30 is received in an opening of the first barrel cam 10, wherein the cross-sectional shape of the central rod is non-circular, and the cross-sectional shape of the opening of the first barrel cam 10 has a complementary non-circular shape such that the barrel cam 10 may slide along the central rod 30 in axial direction, whereas it is locked against rotational movements around the rotational axis of the sleeve 4.

When the sleeve 4 is rotated in a first sense of rotation the first cam follower 6 slides along a helical cam groove 12 formed in the surface of the barrel cam 10. Since the axial position of the first cam follower does not change during its movement within the cam groove 12 the first barrel cam 10 is forced to move in a first direction, to the left hand side in FIG. 9. This movement of the first barrel cam 10 in the first direction is transferred by a compression mechanism 40, here in the form of a compression spring, to a second end stop 34 fixed to the central rod 30 at a distance to the first barrel cam 10. When the shift fork 50 is free to move to the first gear engaged position in the left hand direction, movement of the first barrel cam 10 to the left hand side in FIG. 9 is transmitted through the spring 40 to the central rod (via second end stop 34) so that the coupled shift fork 50 is moved to the first gear engaged position. On the other hand, in case the shift fork 50 is blocked in the neutral position shown in FIG. 9, movement of the first barrel cam 10 to the left hand side by rotating the sleeve 4 in a first sense of rotation will cause movement of the barrel cam 10 in a direction to the left hand side, thereby causing compression of the compression mechanism 40 since the central rod 30 cannot move to the left hand side due to the blocked shift fork 50. When the blocked state of the shift fork 50 is released the compressed compression mechanism 40 expands, thereby moving the central rod 30 and the coupled shift fork to the left hand side to bring the shift fork 50 to the first gear engaged position.

Figure 9:
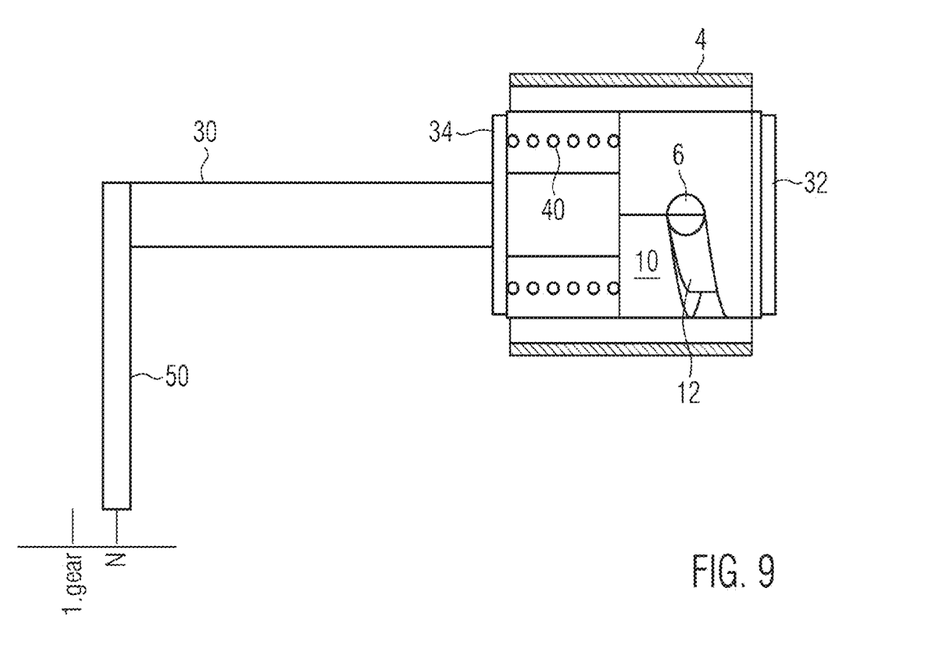
FIG. 9 shows a schematic cross-sectional view of an alternative embodiment of a gear shift actuator according to the present invention.

If in this state the sleeve 4 is rotated in an opposite second sense of rotation barrel cam 10 is moved back to the right hand side to the position shown in FIG. 9, thereby pulling the central rod 30 back and moving the coupled shift fork 50 back from the first gear engaged position to the neutral position. During this movement of the first barrel cam 10 to the left hand side it pushes against a first end stop 32 fixed to the central rod, thereby causing a direct force transfer from the cam drive to the central rod 30.

In this manner the actuation characteristic of the gear shift actuator shown in FIG. 9 is compliant or yielding when the gear shift actuator attempts to move a coupled shift fork 50 from neutral to the first gear engaged position, whereas there is a direct non-yielding force transfer from the first barrel cam 10 to the central rod 30 and the coupled shift fork 50 when it is moved back from the first gear engaged position to the neutral position.

In the following we describe a gear shift actuator which is capable of moving a coupled shift fork from neutral in a first direction to a first gear engaged position, and from neutral in an opposite second direction to a second gear engaged position, wherein in both directions the actuation is compliant or yielding when moving from neutral to the gear engaged position, whereas a direct, stiff force transmission is effected when moving back from one of the in gear engaged positions to the neutral position.

Figure 1:
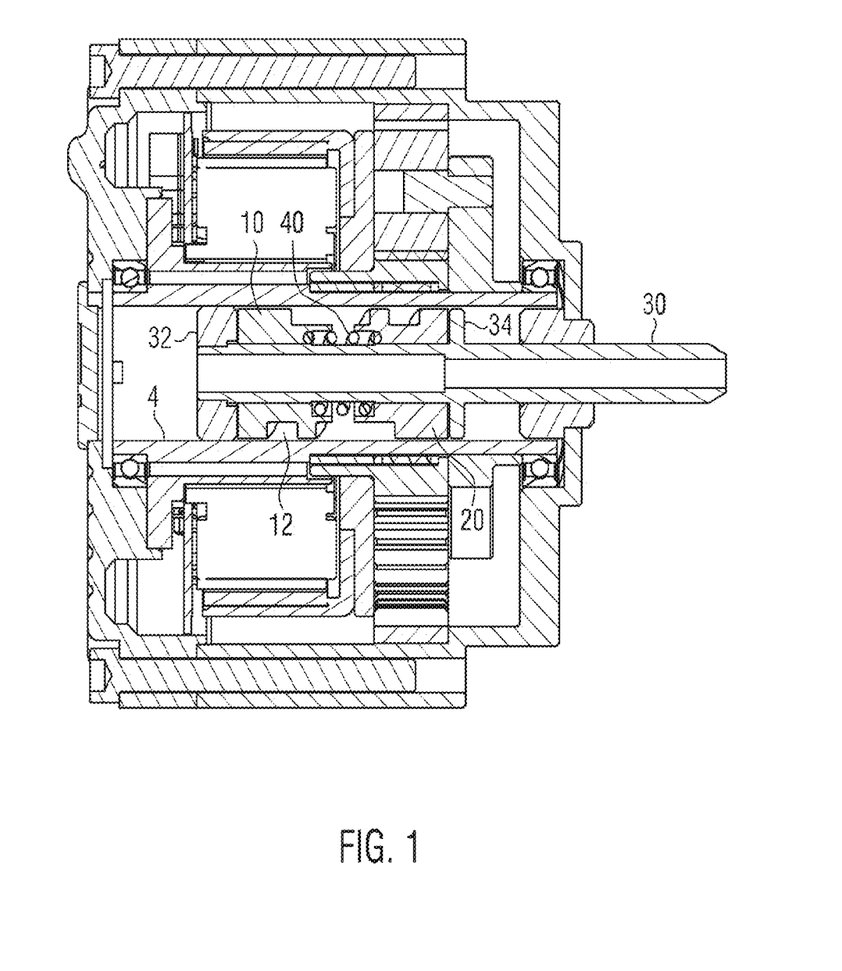
FIG. 1 shows a cross-sectional view of a gear shift actuator according to the present invention.

FIG. 1 shows a cross-sectional view of this embodiment which comprises a hollow, cylindrical sleeve 4 which is rotatably supported in a housing of the gear shift actuator, but unmovably supported with respect to movements in axial direction defined by the rotary axis of the sleeve 4. In FIG. 1 ball bearings are shown at both ends of the sleeve 4 to rotatably support it.

A central rod 30 is extending within the sleeve and protruding from the sleeve and the housing of the gear shift actuator. The central rod 30 supports a first barrel cam 10 and a second barrel cam 20 which are slidably supported on the central rod, but locked against rotational movements with respect to the central rod around the axial direction. The central rod 30 is supported to be moveable in axial direction, but rotational movements around an axis parallel to the axial direction are blocked.

Movement of the first barrel cam 10 to the left hand side is limited by a first end stop 32 fixed on the central rod 30, and movement of the second barrel cam 20 to the right hand side is limited by a second end stop 34 fixed to the central rod 30. Between the first barrel cam 10 and the second barrel cam 20 a compression mechanism 40, here in the form a compression spring, is acting which urges the first barrel cam 10 towards the first end stop 32 and the second barrel cam 20 towards the second end stop 34.

The cooperation of the sleeve 4 and the first and second barrel cams 10, 20 will now be described with reference to FIG. 2 which shows a schematic perspective view of the main components of the gear shift actuator, wherein the outer sleeve 4 is illustrated by dashed lines in a transparent manner to make the interior of the sleeve visible. Within the sleeve 4 a central rod 30 extends, which at one end projects beyond the sleeve 4 (and in fact also protrudes from the housing of the gear shift actuator as shown in FIG. 1). The central rod 30 supports the first and second barrel cams 10, 20 within the interior of the sleeve 4, wherein the first and second barrel cams are slidable in axial direction along the central rod 30, but locked against rotational movements around the axial direction with respect to the central rod. The first barrel cam 10 is provided with a helical cam groove 12 formed in the surface of the first barrel cam 10 and extending about 180° around the circumference of the first barrel cam. Likewise the second barrel cam 20 is provided with a helical cam groove 22 extending about 180° around the circumference of the second barrel cam 20, wherein in the view of FIG. 2 only the beginning or entry of the cam groove 22 is visible and the remaining portion is not visible because it is on a backside of the second barrel cam 20. The remaining circumferential surface portion beyond the cam groove 22 of the second barrel cam is a recessed portion 24. The first barrel cam 10 is likewise provided with a recessed portion 14 in its circumferential portion beyond the first cam groove 12.

The sleeve 4 is provided with a first cam follower 6 and a second cam follower 8 which are projecting from the inner wall of the sleeve to extend to a certain extent radially inwards within the sleeve. The first cam follower 6 is shown in FIG. 2 as a flat pin at the entry to the cam groove 12 of the first barrel cam 10, and the second cam follower 8 is in this state at the opposite entry to the cam groove 22 of the second barrel cam 20.

Figure 2:
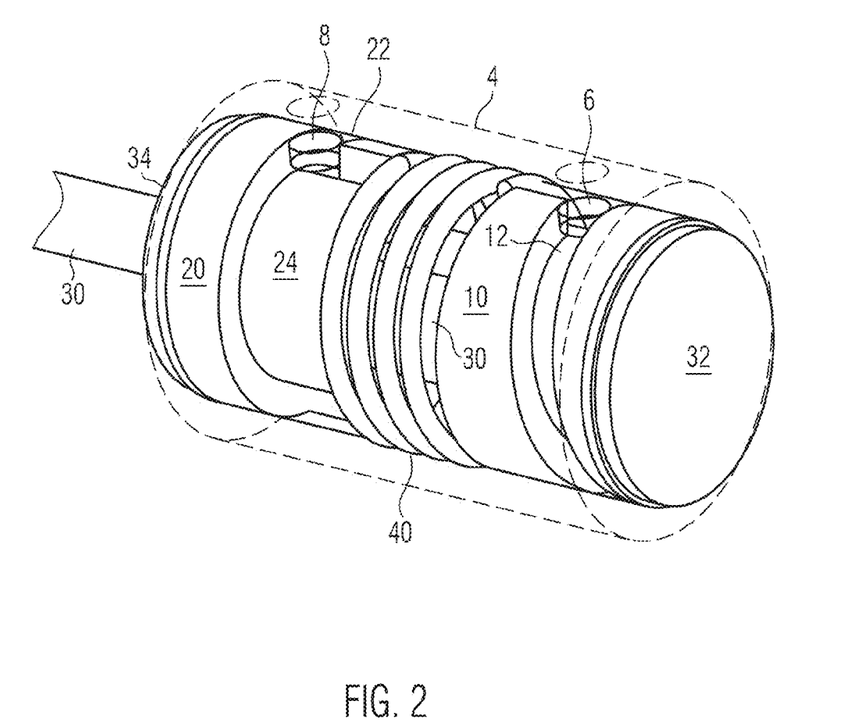
FIG. 2 shows a schematic perspective view of main components of the embodiment of the gear shift actuator according to the present invention.

If the sleeve 4 is rotated in FIG. 2 (when looking at first end stop 32) in an anti-clockwise sense the first cam follower 6 slides from the entry point of the cam groove 12 further along the cam groove 12 which causes an axial movement of the first barrel cam 10 in a direction to the left hand side, whereas at the same time the second cam follower 8 is leaving the entry to its associated cam groove 22 and enters the recessed portion 24 of the second barrel cam 20. This illustrates that the first and second barrel cams 6, 8 are, except for a small angular movement range around the position shown in FIGS. 2 and 3, where both cam follower 6, 8 are at the entries to their associated cam grooves 12, 22, the positioning of the first and second cam grooves 6, 8 is alternating, i.e. when the first cam follower 6 is engaged in the cam groove 12 of the first barrel cam 10, the second cam follower 8 is in the recessed portion 24 of the second barrel cam 20 which therefore is able to perform sliding movement along the central rod 30 because the second cam follower 8 is free to move in axial direction relative to the recessed portion 24 of the second barrel cam, whereas when the second cam follower 20 is engaged within its associated cam groove 22 the first cam follower 6 has reached the recessed portion 14 of the first barrel cam 10 such that the first barrel cam is capable of sliding in axial direction on the central rod 30 relative to the sleeve 4 because the first cam follower 6 is free to axially move within the recessed portion 14 of the first barrel cam 10. In other words if one of the two barrel cams 10, 20 is driven by rotation of the sleeve 4 and the engagement of the respective cam follower in the cam groove of the respective barrel cam and thus moves in axial direction with respect to the sleeve 4, the other one of the first and second barrel cam 10, 20 is decoupled from the sleeve 4 because its associated cam follower is located in the recessed portion of the other one of the first and second barrel cam 10, 20. This means that when one of the barrel cams 10, 20 is axially moved by rotation of the sleeve and engagement of the associated cam follower in its cam groove, the other barrel cam being driven by the movement of the moving barrel cam by force transmitted through the compression mechanism is free to move axially with respect to the central rod and can thus move in case axial movement of the central rod should be blocked by a blocked shift fork.

This alternating driving scheme of the two barrel cams 10, 20 will now be described with reference to a number of movement steps illustrated in FIGS. 3 to 8.

Figure 3:
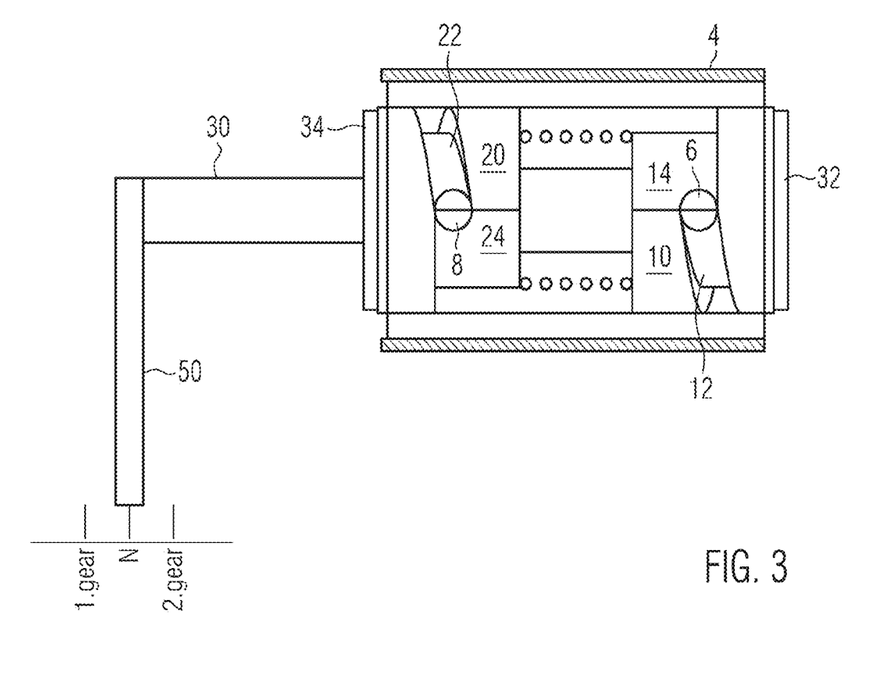
FIGS. 3 to 8 show schematic views, partially in cross-section, of a several actuation steps of the gear shift actuator.
Figure 4:
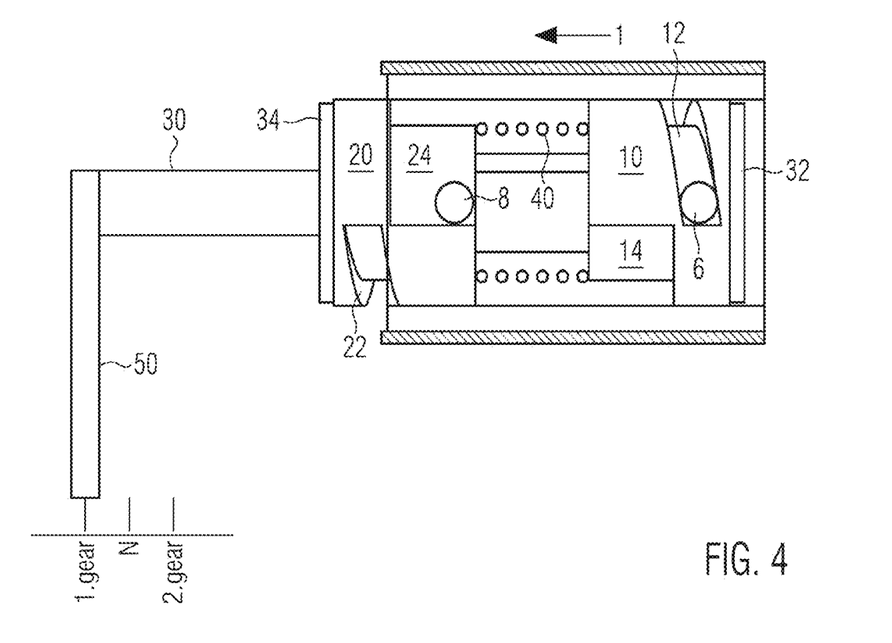

In the schematic illustration of FIG. 3 the gear shift actuator is shown with a position of the central rod 30 in which a coupled shift fork 50 is in a neutral position. If the sleeve 4 is now rotated in a first sense of rotation such that the first cam follower 6 is moved to slide along the cam groove 12 about 180° to an opposite end of the cam groove 12 (this end point of the movement is shown in FIG. 4) the first barrel cam 10 is moved in axial direction in a first direction illustrated by arrow 1, to the left hand side to reach the positioning shown in FIG. 4. If shift fork 50 coupled to the central rod is free to move this movement of the first barrel cam 10 in the first direction 1 is transmitted through the compression mechanism 40 to the second barrel cam 20 which is therefore likewise axially moved to drive the central rod 30 via the second end stop 34, which movement of the central rod 30 is transferred to the shift fork 50 which is therefore moved to the first gear engaged position shown in FIG. 4.

Figure 5:
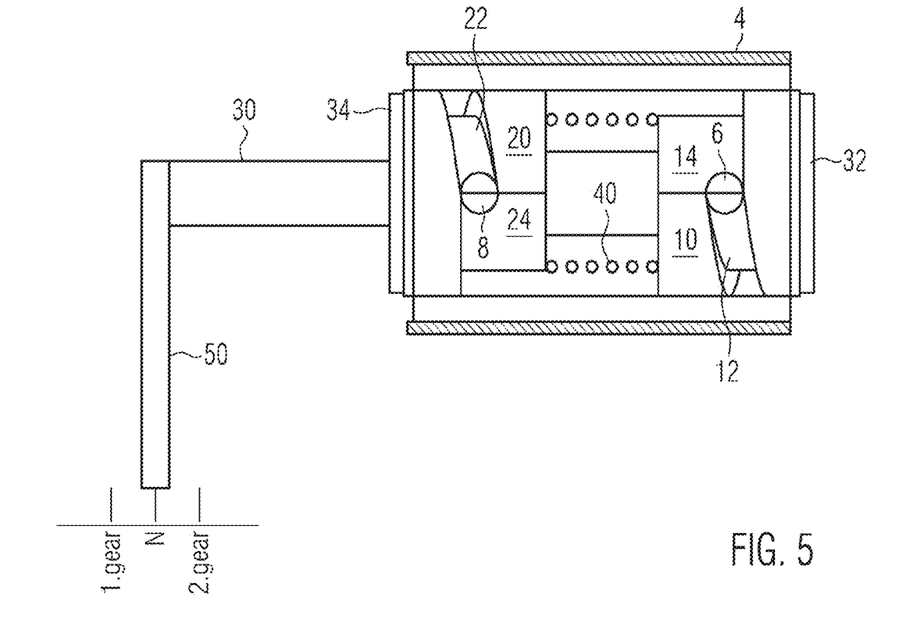
Figure 6:
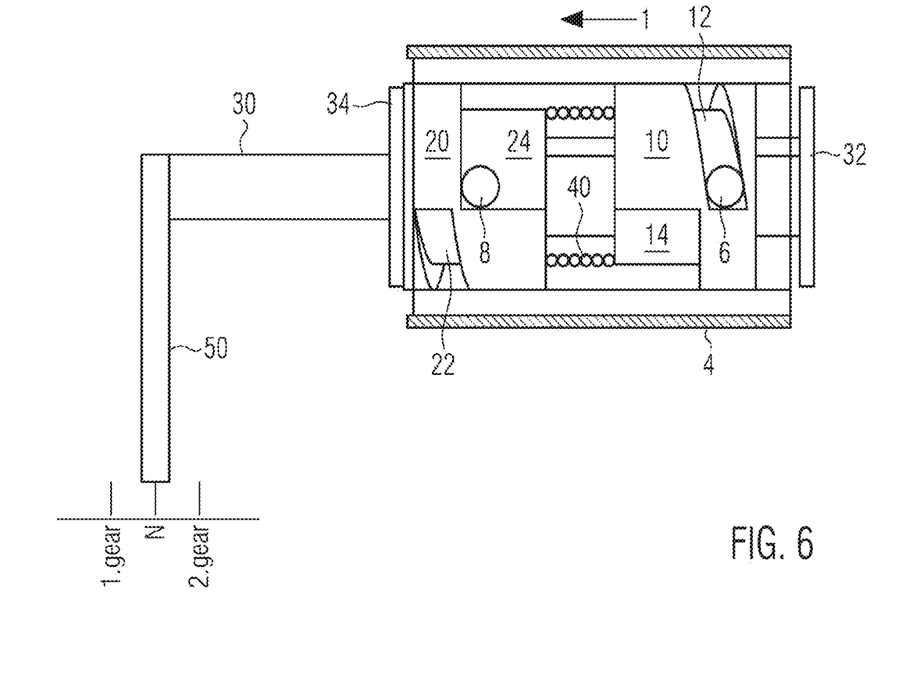

FIGS. 5 and 6 illustrate the same rotational movement step of the sleeve 4 in the situation when the shift fork 50 coupled to the central rod 30 is blocked. In this case the first barrel cam 10 has been driven to make the same axial movement in the first direction 1 to the left hand side as in FIG. 4, but since the central rod 30 was blocked by the blocked shift fork 50 the axial movement of the first barrel cam 10 in the first direction could not be transmitted to the second barrel cam 22 which was therefore moved in a sliding manner relative to the central rod 30, thereby compressing the compression mechanism 40 between the first and second barrel cams 10, 20. During the compression movement of the compression mechanism 40 and the sliding movement of the second barrel cam 20 closer to the first barrel cam 10 the second cam follower 8 associated with the second barrel cam 20 has moved in axial direction relative to the recessed portion 24 of the second barrel cam 20, as can be seen when comparing FIGS. 4 and 6.

Figure 7:
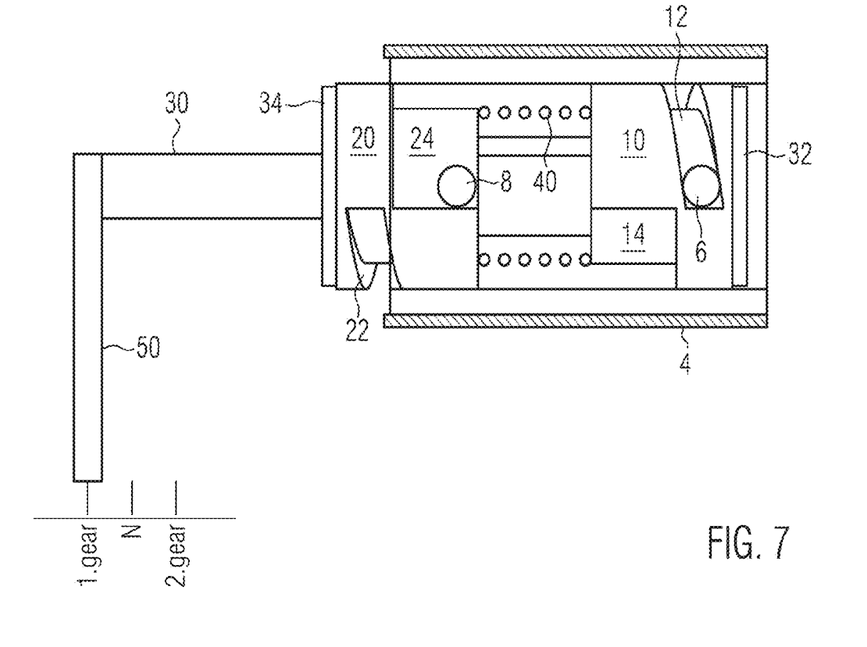

When in the situation of the gear shift actuator illustrated in FIG. 6 the blocked state of the shift fork 5 ends the actuation force stored in the compressed compression mechanism 40 is released to expand the compression mechanism 40 again which drives axial movement of the second barrel cam 20 in the first direction 1 (FIG. 6) to the left hand side which movement of the second barrel cam 20 is transmitted via the end stop 34 to the central rod 30 which thereby moves the coupled shift fork 50 to the first gear engaged position shown in FIG. 7.

Figure 8:
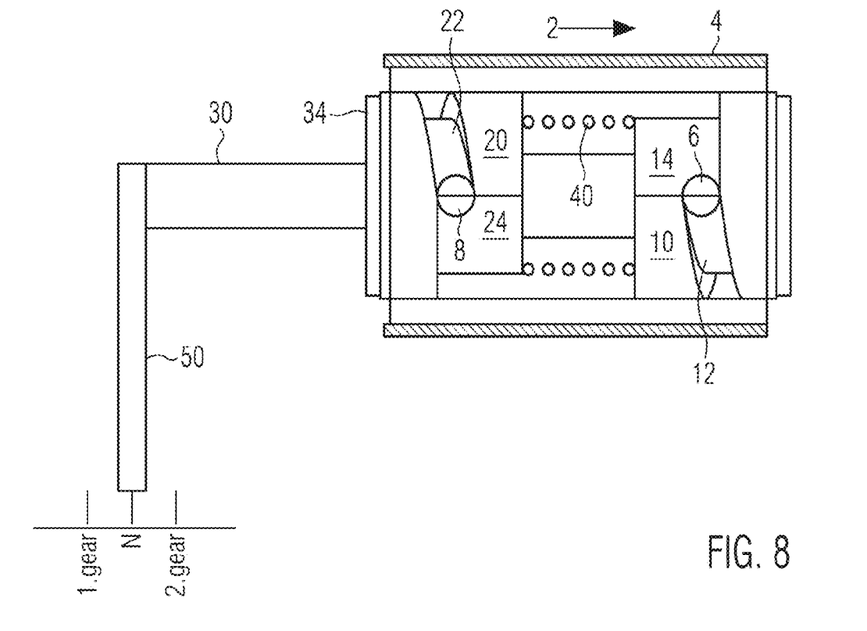

For the transition from the state of FIG. 7 (first gear engaged position) back to the neutral position of the shift fork the sleeve 2 is rotated in a second sense of rotation opposite to the first sense, thereby causing an axial movement of the first barrel cam 10 in a second direction, illustrated in FIG. 8 by arrow 2, to move the first barrel cam 10 to the right hand side. This movement of the first barrel cam 10 in the second direction to the right hand side is transmitted via the first end stop 32 to the central rod 30 which thereby pulls shift fork 50 from the first gear engaged position of FIG. 7 to the neutral position shown in FIG. 8.

When the sleeve 4 in the state of FIG. 8 is further rotated in the second sense of rotation, the second barrel cam 20 is axially driven in the second direction of arrow 2 relative to the sleeve 4 which movement is transmitted by the central rod 30 to the coupled shift fork 50 to move it from neutral to the second gear engaged position. If in the situation of FIG. 8 the shift fork 50 is blocked while the sleeve 4 is rotated in the second sense of rotation to move the second barrel cam 20 in the second direction 2, the second barrel has 20 to move axially relative to the central rod 40, which central rod is blocked by the blocked shift fork 50, whereby the movement of the second barrel cam 20 in the second direction 2 to the right hand side compresses the compression mechanism 40. If the compression mechanism 40 has been brought to the compressed state and the blocked state of the shift fork 50 ends the force released by the expanding compression mechanism will pull the central rod 30 in the second direction 2 to bring the coupled shift fork 50 from the neutral position to the second gear engaged position.

Figure 10:
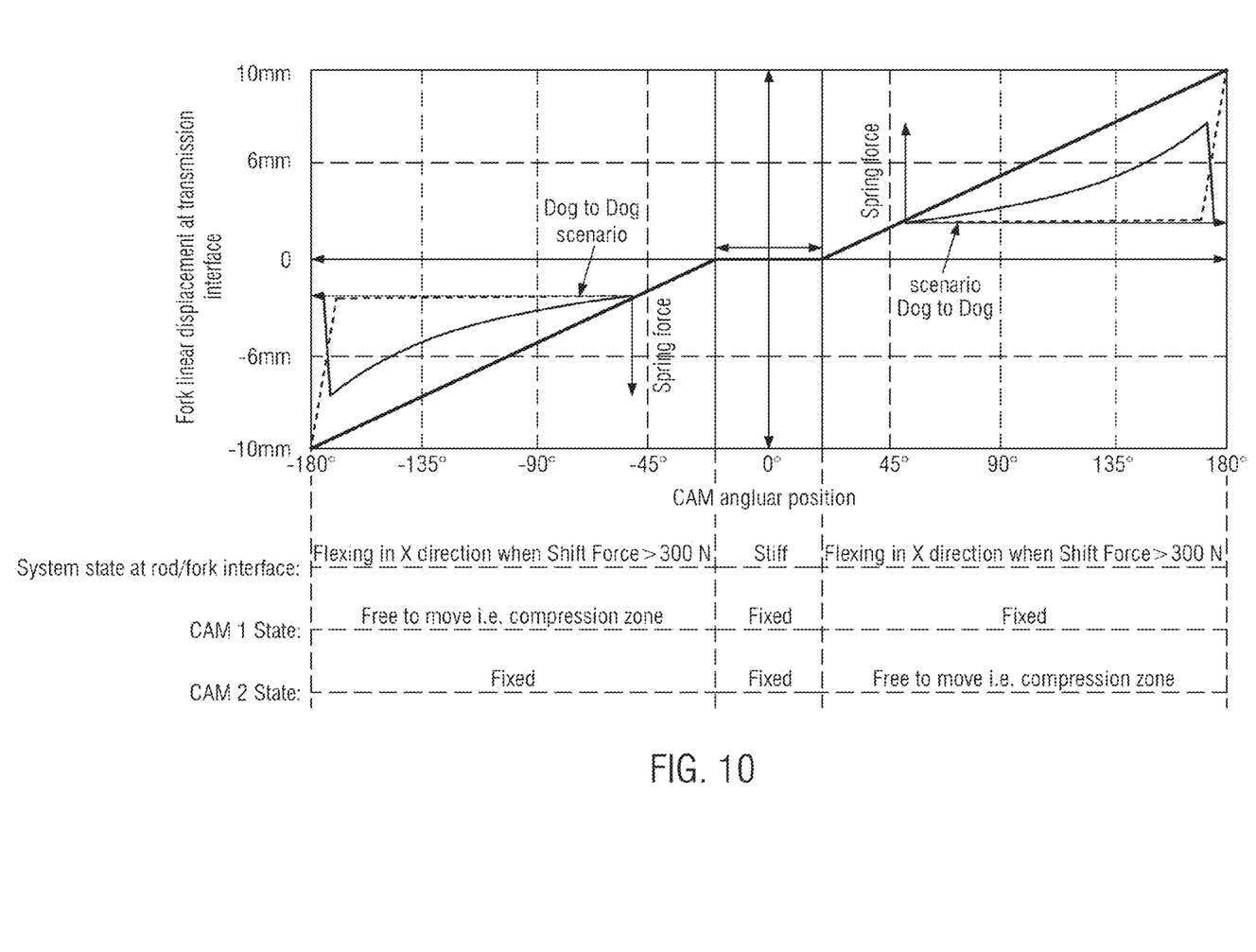
FIG. 10 shows a functional diagram illustrating the actuation characteristics of the gear shift actuator of the embodiment shown in FIGS. 1 to 8, wherein the actuation movement effected by the gear shift actuator is shown as a function of a rotational angle of a rotary member of a linear drive assembly of the gear shift actuator.

The functional diagram of FIG. 10 illustrates the actuation characteristics of the above-described embodiment of FIGS. 1 to 8. FIG. 10 shows the linear displacement of the central rod of the gear shift actuator in axial direction (indicated by the full line) as a function of the rotation angle of the sleeve 4 relative to the first and second cam barrels. There is a small angular range around 0° where there is no displacement as a function of the turning angle of the sleeve (horizontal part of the full line). This is due to the fact that in the state as illustrated in FIG. 3 rotation of the sleeve 4 in either sense of rotation will not immediately result in an axial displacement of one of the first and second barrel cams 10, 20, but axial displacement starts after the associated one of the cam followers 6, 8 has moved completely into the associates one of the cam grooves 12, 22, and once this initial angular turning phase has been passed the engagement of the respective one of the cam followers 6, 8 causes a linear displacement of the associated one of the first and second barrel cams 10, 20, as shown in FIG. 10 by the linear rising full line at positive angles and by the linearly decreasing full line shown for negative turning angles, wherein this linear displacement indicated by the full straight lines takes place if the coupled shift fork is free to follow the movement from the neutral state to the first or second gear engaged position.

Also illustrated in FIG. 10 is the blocked shift fork situation, indicated in the areas "scenario dog to dog", which means that the shift fork is unable to move into the position corresponding to engagement because there is dog to dog opposition of the two parts to be engaged which prevents engagement. For these cases the movement state of the central rod is illustrated by the dashed line which at the beginning is extending essentially horizontally because the central rod is blocked. Also illustrated in the areas indicated by "scenario dog to dog" is the development of the spring force (shown in full line in the superimposed diagrams showing the spring force as a function of turning angle) with further turning movement of the sleeve relative to the first and second barrels cams, wherein the spring force is increasing by further compression of the compression mechanism. As soon as the dog to dog opposition has ended the blocked shift fork is free to move and the central rod is axially displaced by the load of the compression mechanism which is released (indicated by the rapidly dropping spring force). This release of the compression mechanism is accompanied by axial displacements of the central rod indicated by the rapidly increasing (decreasing) dashed line close to the end of the turning range at 180° (−180°) illustrating that the central rod in this phase moves the shift fork to the respective gear engaged position.

As can also be seen from FIG. 10, the central rod is also in the case of a blocked shift fork first moving in axial direction over a certain distance until its movement is blocked by the shift fork. The reason is on the one hand that the coupling of the central rod to the shift fork is such that the central rod first has to move towards the shift fork until a force transmitting contact is established at the interface between central rod and shift fork. On the other hand the two parts to be engaged have first to be moved relative towards to each other until their respective dogs have been moved into the same plane so that a blocking situation may arise.

The invention claimed is:
1. A gear shift actuator comprising:
a linear drive assembly having a rotary member which is supported in a housing to be rotatable, but unmovable in an axial direction defined by its rotary axis,
an electric motor for rotating the rotary member, and
a driven component engaged by the rotary member to transmit rotary movement of the rotary member into a linear movement of the driven component along the axial direction for driving a shift fork from a neutral position to a first gear engaged position and back to neutral, when the rotary member is driven to rotate in a first sense of rotation and in a second sense of rotation opposite to the first sense of rotation, respectively,
characterized in that:
the rotary member comprises a hollow cylindrical sleeve (4) which is provided with a first cam follower (6) projecting inwardly from an inner wall of the sleeve (4),
the driven component comprises a first barrel cam (10) which has a helical cam groove (12) in its outer wall configured to receive the first cam follower (6) and which is supported in the sleeve (4) by a central rod (30) to be slidably moveable in the sleeve along the central rod (30) in axial direction but to be locked against rotational movements around the axial direction with respect to the central rod (30),
the central rod (30) is supported in the housing to be moveable in axial direction but to be locked against rotational movements around the axial direction, and carries a second end stop (34) coupled thereto at a distance to the first barrel cam (10), the central rod (30) being configured to project from the housing and to be linked to a shift fork for driving the shift fork,
a compression mechanism (40) is configured to extend the central rod (30) from the first barrel cam (10) by biasing the second end stop (34) away from the first barrel cam (10), wherein the biased movement is limited by a first end stop (32) on the central rod (30) abutting against the first barrel cam (10), and
the helical cam groove is configured such that rotation of the sleeve (4) in the first sense of rotation moves the first barrel cam (10) axially in a first direction, which movement is transmitted via the compression mechanism (40) to the central rod (30) to drive a coupled shift fork (50) from the neutral position towards the first gear engaged position, and such that rotation of the sleeve (4) in the second sense of rotation moves the first barrel cam in an opposite second direction, which movement is transmitted to the central rod (30) to drive a coupled shift fork (50) from the first gear engaged position to the neutral position.

2. The gear shift actuator according to claim 1, characterized in that:
  between the second end stop (34) and the compression mechanism (40) a second barrel cam (20) is supported by the central rod (30) to be axially moveable, but locked against rotational movement around the axial direction with respect to the central rod, the second barrel cam (20) being biased by the compression mechanism (40) towards the second end stop (34),
  the sleeve (4) is provided with a second cam follower (8) which is circumferentially aligned with the first cam follower (6) and which is received in a helical cam groove (22) of the second barrel cam (20),
  each of the helical cam grooves (12, 22) extends partially around the circumference, whereas the remaining circumferential portion of the respective barrel cam surface is a recessed portion (14, 24) such that the respective cam follower (6, 8) is free to move in the recessed portion (14, 24) in axial direction, and
  the helical cam grooves (12, 22) of the first and second barrel cams (10, 20) are in rotational direction offset by 180° with respect to each other such that, when the first cam follower (6) is entering the cam groove (12) of the first barrel cam (10), the second cam follower (8) is leaving its cam groove and entering the recessed portion (24) of the second barrel cam (20), so that, when the central rod (30) is in the position corresponding to the neutral position of a coupled shift fork, rotation of the sleeve (4) in the second sense of rotation moves the second barrel cam (20) in the second direction (2), which movement is transmitted through the compression mechanism (40) to the central rod (30) to drive a coupled shift fork (50) from neutral position towards a second gear engaged position, and such that, when the central rod (30) is in the position corresponding to the second gear engaged position of a coupled shift fork, rotation of the sleeve (4) in the first sense of rotation moves the second barrel cam (20) in the first direction (1), which movement is transmitted to the central rod (30) to drive a coupled shift fork (50) from the second gear engaged position back to the neutral position.

3. The gear shift actuator according to claim 1, characterized in that the compression mechanism (40) is formed by a compression spring extending in the axial direction from the first barrel cam (10) along the central rod in a direction towards the second end stop (34) on the central rod (30) remote from the first barrel cam (10) to bias the second end stop (34) away from the first barrel cam (10).

4. The gear shift actuator according to claim 2, characterized in that the central rod has a non-circular cross-sectional shape and that each of the first and second barrel cams (10, 20) has an opening of complementary cross-sectional shape such that the central rod (30), when it is received in the openings of the first and second barrel cams (10, 20), allows sliding movement of the first and second barrel cams (10, 20) in axial direction but locks the first and second barrel cams (10, 20) against any rotational movements around the axial direction.

5. The gear shift actuator according to claim 1, characterized in that the compression mechanism (40) and a sliding resistance of the first barrel cam (10) for axial movements on the central rod (30) are arranged such that the first barrel cam starts moving along the central rod and starts to compress the compression mechanism (40) once a predetermined threshold force is acting between the first barrel cam (10) and the central rod (30).

6. The gear shift actuator according to claim 2, characterized in that the second barrel cam (20) has the same shape as the first barrel cam (10) but is rotated with respect to the first barrel cam (10) such that their respective front faces are facing each other, wherein the second barrel cam is further rotated by 180° around the axial direction relative to the first barrel cam (10).

7. The gear shift actuator according to claim 2, characterized in that the compression mechanism (40) is formed by a compression spring extending in the axial direction from the first barrel cam (10) along the central rod in a direction towards the second end stop (34) on the central rod (30) remote from the first barrel cam (10) to bias the second end stop (34) away from the first barrel cam (10).

8. The gear shift actuator according to claim 3, characterized in that the central rod has a non-circular cross-sectional shape and that each of the first and second barrel cams (10, 20) has an opening of complementary cross-sectional shape such that the central rod (30), when it is received in the openings of the first and second barrel cams (10, 20), allows sliding movement of the first and second barrel cams (10, 20) in axial direction but locks the first and second barrel cams (10, 20) against any rotational movements around the axial direction.

9. The gear shift actuator according to claim 2, characterized in that the compression mechanism (40) and a sliding resistance of the first barrel cam (10) for axial movements on the central rod (30) are arranged such that the first barrel cam starts moving along the central rod and starts to compress the compression mechanism (40) once a predetermined threshold force is acting between the first barrel cam (10) and the central rod (30).

10. The gear shift actuator according to claim 3, characterized in that the compression mechanism (40) and a sliding resistance of the first barrel cam (10) for axial movements on the central rod (30) are arranged such that the first barrel cam starts moving along the central rod and starts to compress the compression mechanism (40) once a predetermined threshold force is acting between the first barrel cam (10) and the central rod (30).

11. The gear shift actuator according to claim 4, characterized in that the compression mechanism (40) and a sliding resistance of the first barrel cam (10) for axial movements on the central rod (30) are arranged such that the first barrel cam starts moving along the central rod and starts to compress the compression mechanism (40) once a predetermined threshold force is acting between the first barrel cam (10) and the central rod (30).

12. The gear shift actuator according to claim 4, characterized in that the compression mechanism (40) is formed by a compression spring extending in the axial direction from the first barrel cam (10) along the central rod in a direction towards the second end stop (34) on the central rod (30) remote from the first barrel cam (10) to bias the second end stop (34) away from the first barrel cam (10).

13. The gear shift actuator according to claim 9, characterized in that the compression mechanism (40) is formed by a compression spring extending in the axial direction from the first barrel cam (10) along the central rod in a direction towards the second end stop (34) on the central rod (30) remote from the first barrel cam (10) to bias the second end stop (34) away from the first barrel cam (10).

14. The gear shift actuator according to claim 9, characterized in that the central rod has a non-circular cross-sectional shape and that each of the first and second barrel cams (10, 20) has an opening of complementary cross-sectional shape such that the central rod (30), when it is received in the openings of the first and second barrel cams (10, 20), allows sliding movement of the first and second barrel cams (10, 20) in axial direction but locks the first and second barrel cams (10, 20) against any rotational movements around the axial direction.

15. The gear shift actuator according to claim 9, characterized in that the compression mechanism (40) and a sliding resistance of the first barrel cam (10) for axial movements on the central rod (30) are arranged such that the first barrel cam starts moving along the central rod and starts to compress the compression mechanism (40) once a predetermined threshold force is acting between the first barrel cam (10) and the central rod (30).

* * * * *